United States Patent [19]

Mühle

[11] 4,092,118

[45] May 30, 1978

[54] MIXING HEAD

[75] Inventor: Dietrich Mühle, Kressbronn, Germany

[73] Assignee: The Upjohn Company, Kalamazoo, Mich.

[21] Appl. No.: 743,531

[22] Filed: Nov. 19, 1976

[30] Foreign Application Priority Data

Dec. 8, 1975   Germany .............................. 2555177

[51] Int. Cl.[2] .......................... B01F 15/02; B01J 1/00; B01J 4/00
[52] U.S. Cl. ..................................... 23/252 R; 366/179
[58] Field of Search ................ 23/252 R; 259/4 R, 18

[56] References Cited

U.S. PATENT DOCUMENTS

| | | | |
|---|---|---|---|
| 3,207,486 | 9/1965 | Rosenthal | 23/252 R UX |
| 3,773,298 | 11/1973 | Gebert | 23/252 R X |
| 3,788,337 | 1/1974 | Breer | 23/252 R X |
| 3,964,731 | 6/1976 | Ernst | 259/18 X |

*Primary Examiner*—Joseph Scovronek

*Attorney, Agent, or Firm*—St.Onge, Mayers, Steward & Reens

[57] ABSTRACT

A high pressure mixing head is disclosed for combining a plurality of reactive fluid polymeric components to form a mixture thereof for molding purposes. The mixing head incorporates an expulsion piston operating in a mixing chamber into which the several components are individually admitted through separate inlet openings which are covered and uncovered by reciprocation of the expulsion piston. This piston is actuated by connection to a power piston operating in a power cylinder, and means such as a limit switch assembly is mounted on the power cylinder to detect the position of the power piston and hence the expulsion piston in the mixing chamber. This switch is used to control the "shot time" of the mixing head cycle of operation; that is, the time during which the inlet ports to the mixing chamber remain uncovered by the expulsion plunger to allow the components to enter the mixing chamber through the respective inlet ports. This arrangement affords more accurate control of the shot time than has been provided in similar apparatus heretofore.

4 Claims, 2 Drawing Figures

MIXING HEAD

BACKGROUND OF THE INVENTION

The invention relates to a high pressure mixing head for the production of a mixture of at least two, preferably chemically reactive, plastic components in a mixing chamber which has inlet openings for the individual components and a common outlet opening for the resulting component mixture. An expulsion piston of the same cross section as the mixing chamber, is arranged in the mixing chamber and adapted for reciprocating movement from a retracted position which leaves the inlet openings in the mixing chamber uncovered to an extended position in which the face of the piston is adjacent the common outlet opening, the inlet openings into the mixing chamber being covered by the piston in this later position.

The piston, furthermore, by reason of having the same cross section as the mixing chamber, serves to clear the walls of the mixing chamber of mixture residues as it moves to its extended position.

In a previously proposed mixing head of this type, the inlet openings or ports communicating the mixing chamber with the respective sources of the polymer components open and close alternately and simultaneously without any particular control means having to be provided for the opening and closing, since the inlet openings are respectively opened and closed with reciprocation of the expulsion piston.

The beginning of the injection operation, the so-called shot time, is determined by the beginning of movement of the expulsion piston, something which however in many cases leads to inaccuracy in metering the quantity of the plastics components because at the beginning of its movement the expulsion piston firstly has to be "got moving" out of the one into the other end position. Thus more especially in the case of a substantial elapse of time between two subsequent shots the expulsion piston inclines to "stick" in its particular end position. The consequence of this is that the actual shot time is less than the theoretical or theoretically desirable shot time, so that the metered quantity of the plastics components is too small and this leads to foam products which have to be rejected.

SUMMARY OF THE INVENTION

The aim of the invention is that or remedying the above mentioned disadvantage and providing an improved mixing head, which makes possible substantially more accurate metering than was previously the case. This aim is achieved in accordance with the invention in that the beginning of the shot time can be controlled by sensing the position of the expulsion piston.

Since in accordance with the invention the shot time, or the beginning of it, is directly determined by sensing the position of the expulsion piston, it is possible to avoid any time lag between the movement of the expulsion piston and the course of the shot time. In other words the theoretically calculated and the necessary shot time are in precise agreement with the actual shot time.

A preferred embodiment of the invention is characterised in that the beginning of the shot time is the point in time of the uncovering of the inlet openings by the expulsion piston.

Another preferred embodiment of the invention is characterised in that for sensing the position, determining the beginning of the shot time, of the expulsion piston a limit switch is provided.

In accordance with a preferred embodiment of the inventionthe limit switch is to be actuated by a plunger which moves in a reciprocating manner and which is arranged in one end of a pressure cylinder, which accommodates a double acting working piston and a part of the expulsion piston connected fixedly with the latter.

Further explanation of the invention is provided for by the following description of an embodiment which is represented in the accompanying drawings.

FIG. 1 shows generally the form of a flow diagram for the whole of the injection device with a mixing head designed for two different plastics components, whereas if more than two plastics components are to be processed the flow diagram is to be amplified analogously.

Figure 1:
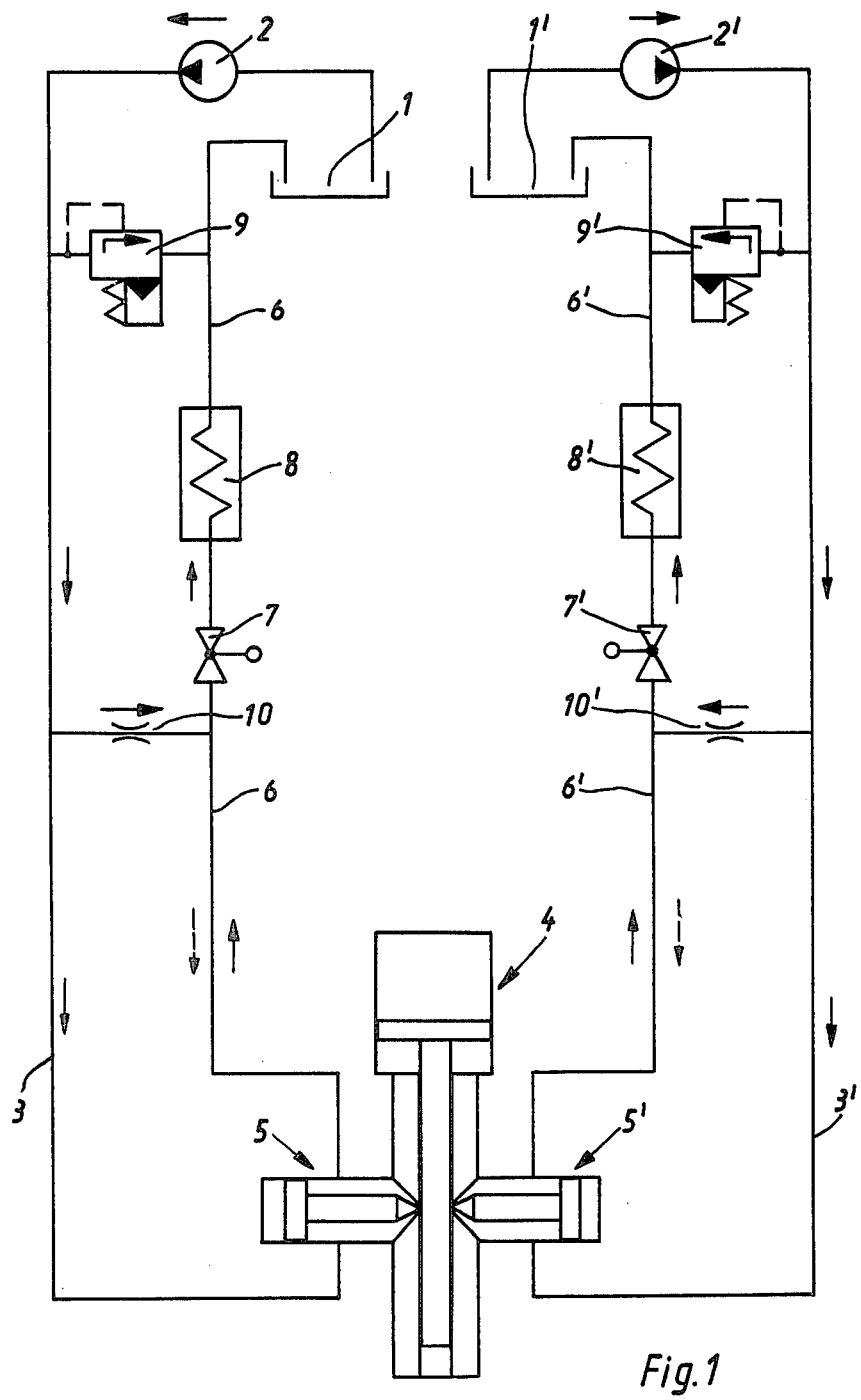
FIG. 1 is a flow diagram of the whole of the injection device with the mixing head.

The flow circuit for the plastics components consists — considered in the direction of flow — of a supply container 1, a pump (for example a radial piston pump) 2, a feed line 3, a mixing head 4 with an inlet valve 5, a return flow line 6, a cock valve 7 and a cooler 8. Between the feed line 3 and the return line 6 there is a pressure limiting valve 9 which is provided at such a position that the pump forms a flow circuit with the supply container 1. Between the feed line 3 and the return line 6 there is furthermore a bypass 10 at such a position that a circuit is formed via the supply container 1, the pump 2, the bypass 10, the shut-off or cock valve 7 and the cooler 8.

During the recycling phase the flow is along the path indicated by the arrows shown in solid lines and owing to a suitable selection of the flow cross-sections only a substantially minor amount of the plastics is recirculated through the inlet valve 5, the major part of the plastics component being recirculated through the bypass 10. During the injection operation started by closing of the cock valve 7 the supply of the plastics component to the inlet valve 5 occurs both through the feed line 3 and also via a part of the return line 6 in the direction of the arrow drawn with broken lines.

The above explanations apply analogously with respect to the circuiting of the other plastics component, which is represented in FIG. 1 on the right-hand side of the drawing, in the case of which like parts are denoted by like reference numerals denoted with a prime, so that description of one set serves for the other as well.

Figure 2:
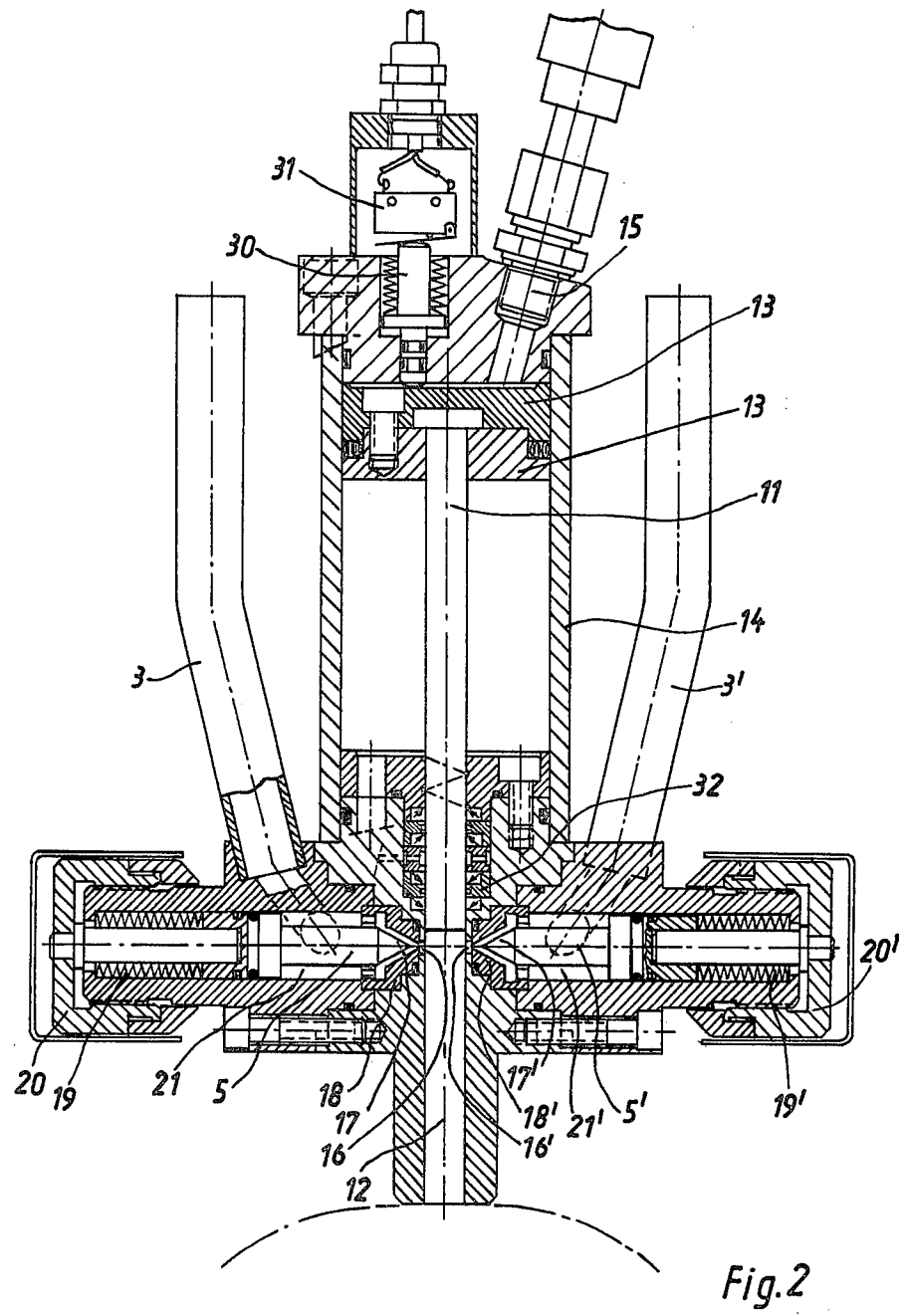
FIG. 2 is a median section through the high pressure mixing head shown only diagrammatically in FIG. 1.

With respect to the high pressure mixing head itself represented in full detail in FIG. 2, in what follows only the parts which are important for function are described.

The mixing head 4 has a central expulsion piston 11, which is lapped into a cylindrical mixing chamber 12 of the same cross-section. The expulsion piston 11 here represented in its upper, retracted, position is caused to reciprocate by a working piston 13 connected rigidly with it, between the position represented in FIG. 2 and an extended position, in which the front end or face of the expulsion piston 11 is flush with the outlet of the cylindrical mixing chamber 12. The actuation of the working piston 13, arranged in a pressure cylinder 14, is brought about by means of a pneumatic or hydraulic pressure medium to one or the other side of the piston.

Of the connections required for supply only the one connection (15) is shown specifically.

At a small distance from the retracted position of the expulsion piston 11 two mutually opposite inlet openings 16, 16' are arranged in the wall of the mixing chamber, which serve for the supply of the two plastics components into the mixing chamber 12 during the injection operation. The two openings 16, 16' are arranged at the same level, that is to say on the same radius so that they are simultaneously opened or uncovered by the expulsion piston 11, something which is required for avoiding undesired lead of one component relative to the other in entering the mixing chamber.

The two inlet openings 16, 16' are directly adjacent to the associated inlet valves 5, 5', whose valve cones 17 and 17' cooperate with valve seats 18, 18' with a suitable mating shape. In order to ensure automatic, pressure dependent opening and closing of the inlet valves 5 and 5', compression springs 19, 19' are provided so that separate means are not required for actuating the inlet valves. For setting the compressive force of the compression springs 19, 19' adjustment bushings 20, 20' are provided, so that the level of opening pressure of the inlet valves 5 and 5' can be adjusted in a very simple manner. This opening pressure must naturally be selected to be higher than the recycling pressure.

The inlet valves 5 and 5' are arranged for reciprocating movement in valve chambers 21 and 21'. Since the valve shanks, forming the centre part of the inlet valves 5 and 5', have a substantially smaller diameter than the associated valve chambers, an annular space with a relatively large cross-section is provided, through which flow occurs on recycling without any undesired increase in pressure being brought about. On recycling the plastics component passes via the feed tube 3 or 3' into the valve chamber 21 or 21' respectively and leaves the latter via the return line 6 or 6' respectively which is not shown, the two inlet valves 5 and 5' being located in the open position shown in FIG. 2.

Owing to the two inlet valves arranged with their axes perpendicularly to the mixing chamber and to the expulsion piston it is therefore possible to avoid action of the plastics components on the expulsion piston and on the mixing chamber during the recycle phase which often lasts a relatively long time, so that no sealing and sticking problems arise. Furthermore recycling can be carried out using a relatively low pressure of approximately 30 atmospheres gauge, since at all positions in the flow circuit sufficiently large flow cross-sections are available, for recycling does not have to be via the mixing chamber inlet openings. In this respect it is also highly advantageous that in any case only a very minor fraction of the total quantity is recycled through the mixing head in accordance with the invention, since the major part of the quantity of plastics recycles through the bypass 10.

On switching over from recycling to injection firstly the cock valve 7 is closed — for example by means of a handle which is not shown — so that the whole quantity of plastics components, which is supplied by the feed pump 2, is pumped via the feed line 3 and a part of the return line 6 into the valve chamber of the inlet valve 5. The same also applies as regards the other plastics component and respectively as regards the oppositely placed inlet valve 5'. Since initially the plastics components cannot escape back to supply container 1, the necessary, high injection pressure of more than 100 atmospheres gauge is very rapidly built up throughout the system, and the precise setting of the high pressure for injection desired is carried out by the pressure limiting valve 9 or 9' respectively. On reaching the desired injection pressure or shortly before the two inlet valves 5 and 5' open and after they open, the expulsion piston 11, previously located in the extended position, is moved into the retracted position shown in FIG. 2. In order to achieve the greatest possible precision in metering it is expedient to cause metering to be carried out exclusively by the expulsion piston 11, for which reason the two inlet valves 5 and 5' are opened shortly before the expulsion piston 11 uncovers the inlet openings 16, 16'.

The injection or shot time is controlled, as will be described in more detail below, directly by the setting of the expulsion piston 11 so that a particularly high degree of precision of metering is achieved. Termination of the injection operation is in this respect brought about by moving the expulsion piston 11 out of the retracted position into the extended (inject) position, where the face of the expulsion piston 11 is flush with the outlet of the mixing chamber 12, so that any mixture residue will be completely expelled out of the mixing chamber 12, something which is also very advantageous for the aspect of precise metering. During termination, or directly after it, of this expulsion operation the cock valve 7 is opened so that switching over to recycling occurs. The change over from the injection operation to recycling leads to an immediate drop from the high injection pressure of more than 100 atmospheres gauge to the low recycling pressure of approximately 30 atmospheres gauge. Simultaneously with this the two inlet valve 5 and 5' automatically close owing to the pressure drop.

Particularly accurate metering of the injected plastics components can be achieved in the following manner.

The end, opposite to the outlet of the expulsion piston 11, of the pressure cylinder 14 has a spring loaded plunger 30 which is arranged in the end of the presure cylinder for reciprocating movement in the longitudinal direction of the pressure cylinder 14 and cooperates with a limit switch 31 arranged outside the pressure cylinder 14. As will be seen from FIG. 2 of the drawing the spring loaded plunger 30 cooperates in such a manner with one end surface of the working piston 13 that at a certain position of the working piston 13 and of the expulsion piston 11 the plunger 30 and the limit switch 31 are actuated. The position, at which actuation of the limit switch 31 occurs, is selected in such a manner that this actuation occurs when the end of the expulsion piston 11 passes or uncovers the inlet openings 16. This point in time of actuation (point in time of passing over or uncovering of the inlet openings 16, 16' by the lower end of the expulsion piston 11) is set as the beginning of the so-called shot time (beginning of the injection operation). In other words the shot time is directly controlled or determined by the expulsion piston 11 or rathermore by sensing of the position of the expulsion piston 11. As a result it is possible to achieve a subsantially more precise metering of the quantities injected than was previously possible with known mixing heads, for in the case of known mixing heads the course of the shot time and the movement of the expulsion piston occur independently of each other or these two operations are initially started simultaneously by a pulse. The consequence of this is however the substantial disadvantage that, in cases in which the expulsion piston must firstly be "got moving" at the beginning of its travel, inaccuracy occurs in the metering, for in such cases the actual shot time is smaller than the calculated shot time. The shot time is thus shortened by a time due to the expulsion piston being "too slow" at the beginning of its movement. Such cases occur relatively often in practice if the time lag between two different shots is relatively large.

In the case of the mixing head in accordance with the invention the above mentioned difficulties are very simply avoided by arranging for the shot time or the duration of the shot to be directly started or controlled by the expulsion piston, so that it is possible to ensure that at the beginning of the shot time the injection procedure immediately begins without any lag of what ever type occurring, which would otherwise lead to too little material being metered out.

At the end of the shot time, whose duration can be set by any suitable device, not specifically shown, the working piston 13, and accordingly simultaneously the expulsion piston 11 are moved out of the retracted position shown in FIG. 2 toward the extended (full expulsion) position. The point in time of passing the inlet openings 16, 16' by the one end of the expulsion piston 11 is in this respect set as the end of the shot time so that the selected shot time is exactly in accord with the actual shot time, that is to say with the actual duration of the injection operation.

Instead of compressed air or instead of conventional hydraulic oil it is possible to use 1,3-dioctyl phthalate as a pressure medium for actuating the working piston, so that undesired reaction between the pressure medium (for actuation of the working piston 13) and the plastics components can be avoided since dioctyl phthalate does not react chemically with conventionally used plastics components, whereas a reaction does occur with hydraulic oil. Such an undesired chemical reaction can accordingly be avoided with the invention even if a thin film of pressure medium should be transported by the expulsion piston 11 out of the one working chamber of the pressure cylinder 14 into the mixing chamber 12 despite the intermediate seals 32.

The mixing head is used principally for the production of polyurethane foam material, that is to say more particularly cushions, automobile seats and the like. In the case of the production of such a polyurethane foam material the two plastics components consist of toluene diisocyanate and a polyol.

I claim:

1. A mixing head for mixing at least two different plastic material components, comprising a casing having an axially elongated cylindrical mixing chamber, separate inlet ports entering said chamber intermediate its axial extent for introducing into said chamber the respective plastic components to be mixed therein, said chamber having a common outlet at one end for expulsion therefrom of the component mixture formed therein, an expulsion piston having a free end facing said outlet, said piston being received in said mixing chamber and reciprocable therein between a retracted position wherein its free end is retracted beyond said inlet ports, thereby uncovering them to allow entry of components into the mixing chamber, and an extended position wherein said free end of said piston is substantially coincident with said outlet of said mixing chamber, thereby causing said piston to expel component mixture therefrom and cover said inlet ports to prevent entry of further components into said mixing chamber, means for reciprocating said expulsion piston, means for determining the duration of the period during which said inlet ports are uncovered by reciprocation of said piston, and means actuated by said piston for initiating operation of said last-named means.

2. A mixing head as defined in claim 1, wherein said piston actuated means is positioned to be actuated when said expulsion piston uncovers said inlet ports during movement of said piston towards said retracted position.

3. A mixing head as defined in claim 1, wherein said piston actuated means is a limit switch assembly.

4. A mixing head as defined in claim 3, wherein said means for reciprocating said expulsion piston includes a power cylinder and piston, the latter being directly connected to said expulsion piston, and said limit switch assembly is mounted on said power cylinder and includes a plunger projecting therethrough into position for contact by said power piston.

* * * * *